US012805661B2

(12) United States Patent
Weber et al.

(10) Patent No.: US 12,805,661 B2
(45) Date of Patent: Nov. 24, 2026

(54) IMMERSION BREWING DEVICE AND METHOD

(71) Applicant: Strategic Exits LLC, Incline Village, NV (US)

(72) Inventors: Douglas Weber, Incline Village, NV (US); Christopher Flechtner, Kyoto (JP)

(73) Assignee: Strategic Exits LLC, Incline Village, NV (US)

( * ) Notice: Subject to any disclaimer, the term of this patent is extended or adjusted under 35 U.S.C. 154(b) by 682 days.

(21) Appl. No.: 18/219,648

(22) Filed: Jul. 8, 2023

(65) Prior Publication Data

US 2025/0009163 A1 Jan. 9, 2025

(51) Int. Cl.

*A47J 31/20* (2006.01)
*A23F 5/26* (2006.01)
*A47J 31/44* (2006.01)

(52) U.S. Cl.

CPC ................. *A47J 31/20* (2013.01); *A23F 5/26* (2013.01); *A47J 31/4407* (2013.01); *A47J 31/446* (2013.01)

(58) Field of Classification Search

CPC ...... A47J 31/20; A47J 31/4407; A47J 31/446; A47J 31/18; A23F 5/26

See application file for complete search history.

(56) References Cited

U.S. PATENT DOCUMENTS 1,797,672 A 3/1931 Paolini
7,040,218 B1 * 5/2006 Biolchini, Jr. .......... A47J 31/20 99/287
10,226,147 B2 3/2019 Harper
10,517,421 B2 12/2019 Habram
10,694,883 B2 6/2020 Harper
11,297,971 B2 4/2022 Harper
(Continued)

FOREIGN PATENT DOCUMENTS

WO 00/27261 5/2000

OTHER PUBLICATIONS seriouseats.com, Jun. 27, 2023, https://www.seriouseats.com/the-best-french-press-coffee-makers-5197670 (24 pages).
(Continued)

*Primary Examiner* — Justin C Dodson
*Assistant Examiner* — Krystene Nhelle B Maceda
(74) *Attorney, Agent, or Firm* — Todd R. Miller

(57) ABSTRACT

An immersion brewing device and method of using same are disclosed. The brewing device comprises a body, a lid, a basket contained within the body, a pull-up means for creating vacuum pressure within the body, an agitator coupled to the pull-up means and detachably coupled to the basket, and a locking means for locking the agitator to the pull-up means. The pull-up means comprises a main shaft having a top and an opposing bottom, a spinner cap disposed about the top of the main shaft, and a wingnut rotatably disposed about the main shaft. The agitator comprises one or more flat blades angled to create a helicopter-blade-like-movement. The locking means comprises a detent and a detent channel adapted to receive the detent, wherein the detent is disposed about one end of each blade, and wherein the detent channel is cut into the basket.

10 Claims, 3 Drawing Sheets

(56) References Cited

U.S. PATENT DOCUMENTS

| | | | | |
|---|---|---|---|---|
| 2017/0295987 | A1* | 10/2017 | Habram | A23F 5/26 |
| 2019/0223650 | A1* | 7/2019 | Dujmich | A47J 31/20 |
| 2020/0015619 | A1* | 1/2020 | Chimezie | A47J 31/38 |

OTHER PUBLICATIONS amazon.com, Jun. 27, 2023, https://www.amazon.com/Bodum-Chambord-French-Coffee-Chrome/dp/B00008XEWG (15 pages).
seriouseats.com, Jun. 27, 2023, https://www.seriouseats.com/how-to-make-better-french-press-coffee-tips-technique-grind-timing (10 pages).
youtube.com, Jun. 27, 2023, https://www.youtube.com/watch?v=st571DYYTR8 (6 pages).
wikipedia.org, Jun. 27, 2023, https://en.wikipedia.org/wiki/French_press (8 pages).
Perfectdailygrind.com, Jun. 27, 2023, https://perfectdailygrind.com/2023/01/what-is-syphon-brewing/ (11 pages).

* cited by examiner

IMMERSION BREWING DEVICE AND METHOD

BACKGROUND

The present disclosure relates generally to immersion brewing devices and methods of using same.

OBJECT AND SUMMARY

The object of the instant invention is to create a unique, no-bypass immersion brewing device that uses vacuum pressure for forceful extraction without adversely affecting the quality of the brewed substance. One exemplary embodiment of the disclosed subject matter is an immersion brewing device comprising a body having a top and an opposing bottom, a lid disposed about the top, a basket contained within the body for holding coffee grounds, a pull-up mechanism in sealed communication with the lid and the basket, and an agitator for agitating water contained within the body above the coffee grounds, wherein the agitator is in communication with the pull-up mechanism, and wherein engagement of the pull-up mechanism creates vacuum pressure to pull brewed coffee through the coffee grounds.

The basket preferably comprises a basket body having a top and an opposing bottom, and a filter screen detachably coupled to the bottom of the basket body. The pull-up mechanism preferably comprises a main shaft having a top and an opposing bottom, a spinner cap disposed about the top of the main shaft, and a wingnut rotatably disposed about the main shaft.

The agitator preferably comprises one or more flat blades each having a first end and an opposing second end, wherein each blade is angled downwards a few degrees from the first end to the second end. The immersion brewing device may also include a locking mechanism for locking the agitator to the basket.

The locking mechanism preferably comprises a detent and a detent channel adapted to receive the detent, wherein the detent is disposed about the first end of the flat blade, and wherein the detent channel is cut into the basket.

Another exemplary embodiment of the disclosed subject matter is a method of immersion brewing. The method preferably comprises placing a substance to be brewed into a basket having a flange seal, pushing the basket inside an open-ended body having a top and an opposing bottom, pouring hot water into the body, and placing a lid onto the top of the body, wherein the lid is communication with a main shaft having a top and an opposing bottom, a spinner cap disposed about the top of the main shaft, a wingnut disposed about the main shaft between the spinner cap and the lid, and an agitator disposed about the bottom of the main shaft. The method may further comprise agitating the hot water by rotating the spinner cap and holding the wingnut in place, waiting for the substance to infuse into the hot water, spinning the wingnut until the agitator becomes locked to the basket, and pulling the main shaft upwards to create a vacuum within the body. The method of immersion brewing may further comprise breaking the vacuum to enable pouring out the brewed contents contained within the body. The flange seal is preferably configured such that pushing the basket down into the body is more easily done compared to pulling the basket out the top of the body.

BRIEF DESCRIPTION OF THE DRAWINGS

Some non-limiting exemplary embodiments of the disclosed subject matter are illustrated in the following drawings. Identical or duplicate or equivalent or similar structures, elements, or parts that appear in one or more drawings are generally labeled with the same reference numeral, optionally with an additional letter or letters to distinguish between similar objects or variants of objects, and may not be repeatedly labeled and/or described. Dimensions of components and features shown in the figures are chosen for convenience or clarity of presentation. For convenience or clarity, some elements or structures are not shown or shown only partially and/or with different perspective or from different point of views.

DETAILED DESCRIPTION

There is a constant push to develop innovative brewing devices and methods, with fierce competition and room for improvements becoming increasingly limited. Take for example what may be referred to as the first coffee press, which may have been made in France in the mid 1800's. Such a rudimentary immersion brewing device had a metal or cheesecloth screen fitted to a rod that users would press into a pot of hot water and coffee grounds. Since that time, inventors have strived for years to generate novel renditions of the basic "press-down" brewer. However, the overall design has been largely unchanged for over a hundred years. The modern French press, press pot, cafetière, caffettierier a stantuffo, coffee plunger, coffee press, or however-aptly-named press-down brewing device consists of a narrow cylindrical beaker, usually made of glass or clear plastic, equipped with a metal or plastic lid and plunger that fits tightly in the beaker, wherein the plunger has a fine stainless steel wire or nylon mesh filter attached to one end of the plunger.

In operation, as the name press pot or the like implies, users place ground coffee in the bottom of the beaker, pour hot water into the beaker, wait for the infusion process to occur to create coffee, and then press the plunger down into the beaker such that the filter separates the spent coffee grounds from the coffee. Users wanting to create a great cup of coffee have their own particular tips and tricks. Such tricks include placing the plunger on top of the grounds, pressing it slowly halfway down, and pulling back up slowly to just below the surface. Doing so prevents a dry grounds crust on the surface. After steeping, another trick is to press the plunger down slowly to about ½" above the layer of the coffee grounds at the bottom. Pushing down must be done slowly to avoid agitating the coffee grounds and thereby accelerate extraction right at the end when the coffee grounds have done their job and the bitter and astringent negative flavors are in danger of taking over. Stated differently, the last thing a user wants to do is to create a vacuum in the beaker and thereby draw the spent coffee grounds back through the filter, causing ruin to what could have been a pleasant beverage.

Accordingly, an immersion brewing device and method solving these and other problems are desired.

A general non-limiting overview of practicing the present disclosure is presented below. The overview outlines exemplary practice of embodiments of the present disclosure, providing a constructive basis for variant and/or alternative and/or divergent embodiments, some of which are subsequently described.

Figure 1:
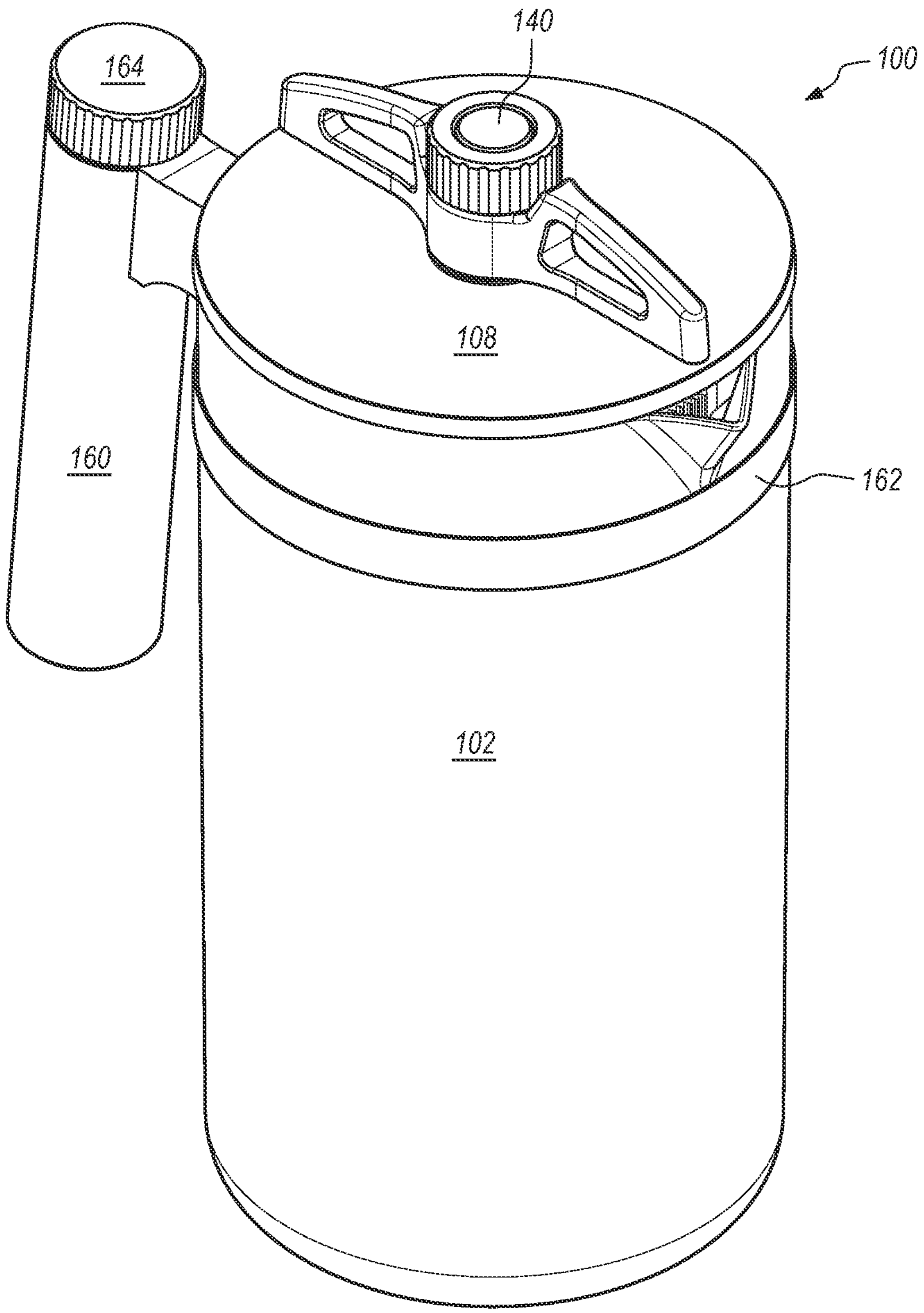
FIG. 1 is a top perspective view of an embodiment of the immersion brewing device disclosed herein.
Figure 2:
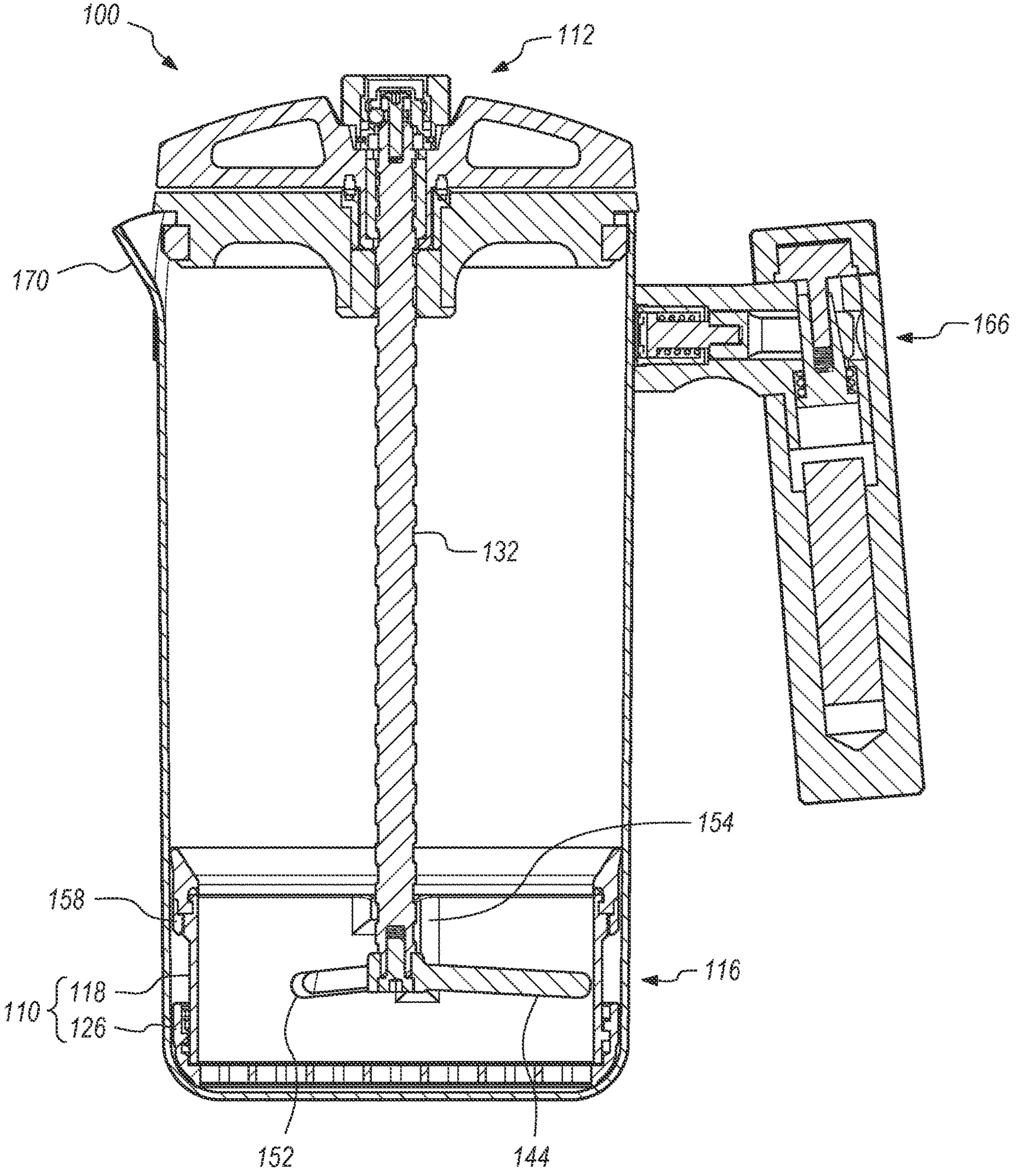
FIG. 2 is a cut-away view of the brewing device seen in FIG. 1.
Figure 3:
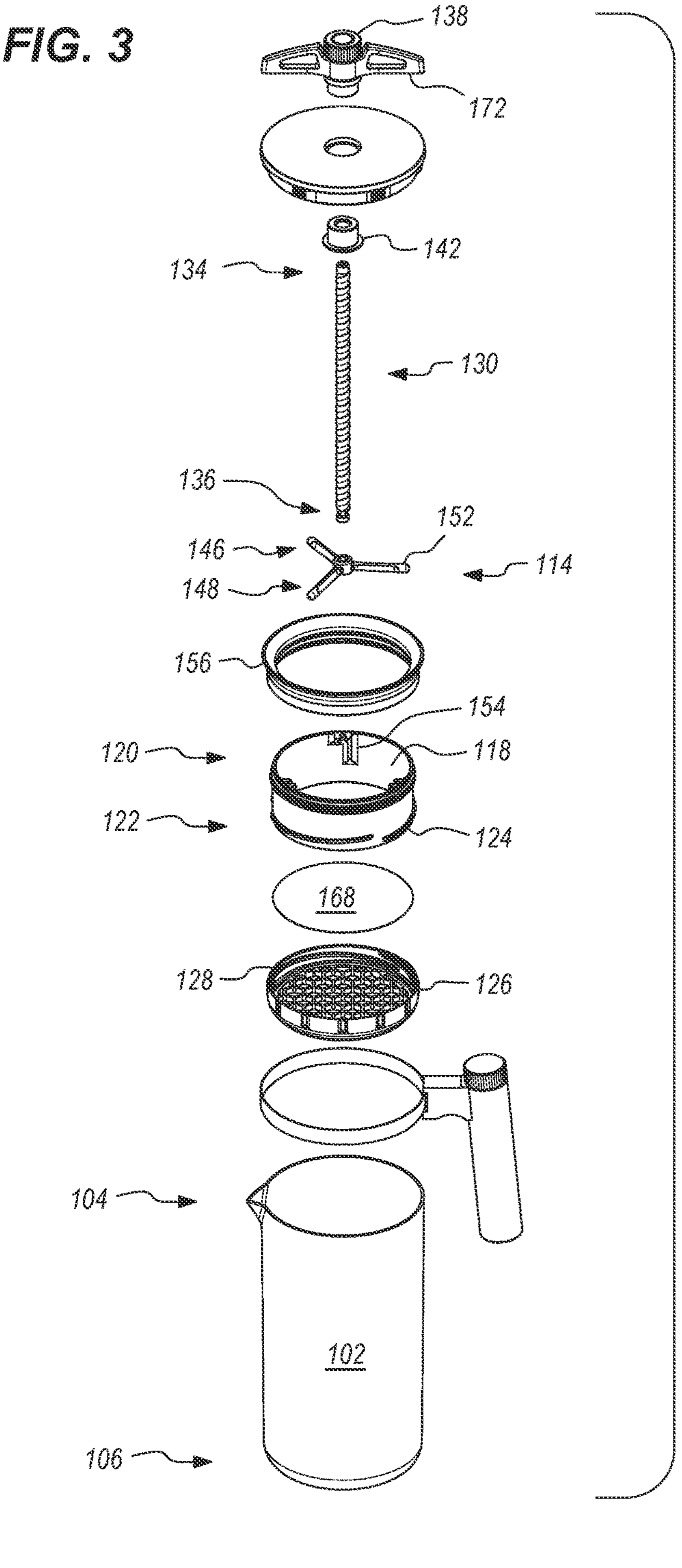
FIG. 3 is an exploded view of the brewing device seen in FIG. 1.

FIGS. 1-3 illustrate an embodiment of a unique, no-bypass immersion brewing device 100 that uses vacuum pressure to forcefully pull brewed coffee through a bed of coffee grounds. The vacuum is created by virtue of pulling a flange seal upward from the bottom of a closed glass vessel. It should go without stating that such an arrangement and corresponding method are wholly counterintuitive to the known French press or press pot, which teaches away from creating a vacuum in its beaker for fear of agitating the coffee grounds after steeping.

Turning in detail to FIGS. 1-3, the brewing device 100 comprises a body 102 having an open-ended top 104 and an opposing bottom 106. The body 102 is preferably cylindrical in shape and made of glass for ease of operation. The body may be comprised of double-walled glass. Using double-wall provides a couple of benefits including but not limited to possibly omitting a handle from the overall brewing device 100, as well as having an extra layer of protection in case one glass wall breaks. A lid 108 is disposed about the top 104 of the body 102. The body 102 has an interior cavity defined by its open-ended cylindrical structure and lid 108.

The brewing device 100 further comprises a basket 110 disposed in the cavity of the body 102 at or near the bottom 106 thereof. The basket 110 may be vertically moved within the cavity of the body 102 by way of a pull-up mechanism 112. An agitator 114 is disposed about one end of the pull-up mechanism 112.

The brewing device 100 also comprises a locking mechanism 116 for locking the agitator 114 against the interior of the basket 110 to permit the basket 110 to pulled away from the bottom 106 of the body 102 and out the top 104 thereof once the coffee has been brewed.

The basket 110 preferably comprises a basket body 118 and a filter screen 126. The basket body 118 has an open-ended top 120 and an opposing bottom 122. The bottom 122 has threads 124 adapted to mate with corresponding threads 128 on the filter screen 126.

The pull-up mechanism 112 preferably comprises a quick-thread main shaft 130 with threads 132 thereupon, wherein the main shaft 130 has a top end 134 and an opposing bottom end 136. A spinner cap 138 is coupled to the top end 134 of the main shaft 130 about the lid 108 via one or more lid grommets 142 to allow the spinner cap 138 to spin freely during the agitating part of the brewing cycle. The spinner cap 138 includes a quick-release button 140 to allow a user to detach the spinner cap 138 from the main shaft 130 without tools for a more thorough cleaning when needed. A wingnut 172 is threadably coupled to the main shaft 130 between the spinner cap 138 and the lid 108.

The agitator 114 comprises one or more blades 144 disposed about the bottom 136 of the main shaft 130. The blades 144 are coupled to the main shaft 130 by a screw centered about the axis of the main shaft 130. As seen in FIG. 3, the device 100 preferably includes three blades 144, each of which has a first end 148 and an opposing second end 146. Each blade 144 is preferably flat and very slightly angled downwards towards the second end 146 at just a few degrees. The flat aspect permits each blade 144 to create the appropriate resistance/turbulence when spinning to effectively agitate the coffee and water together during the brewing cycle. The angled aspect permits each second end 146 to be a touching point on a counter, creating a stable tripod that is not only convenient on the counter but helps to effectively dry the lid 108 and pull-up mechanism 112 after washing.

The locking mechanism 116 preferably comprises a detent-channel arrangement or similar means. In particular, each blade 144 preferably includes a detent 152 at the first end 146 thereof. A corresponding detent channel 154 is cut within the interior of the basket body 118. The detent is preferably an inverted L-shaped wherein each detent channel 154 has one open wall and one closed wall.

The immersion brewing device 100 further includes a flange seal 156 disposed about the top 120 of the basket body 118. A seal retainer 158 keeps the flange seal 156 securely maintained to the basket body 118, particularly during operation of the device 100. The device 100 further comprises a handle 160 disposed about the top 104 of the body 102. The handle 160 is in communication with a handle band 162. A handle tensioning mechanism 166, which includes a rotatable knob 164, permits the handle band 162 to constrict about the top 104 of the body 102 as needed. The device 100 may further include an optional paper filter 168 disposed on top of the mesh filter screen 126. A spout 170 is also disposed about the top 104 of the body 102 for pouring the perfect coffee once the brewing cycle is complete.

In operation, when coffee is the item to be brewed, a user of immersion device 100 begins by grinding coffee beans. The grind itself is preferably much finer than that used in a conventional French press. The coffee grounds (not shown) are then placed in the basket 110. The user then places the basket 110 at or near the bottom 106 of the body 102. Hot water is poured into the body 102. It should be apparent that the device 100 could also be used for cold brew processes, as well as for brewing items other than coffee, such as tea, or used to make soup stock or the like.

The user then engages the pull-up mechanism 112 and corresponding agitator 114. As the wingnut 172 has a female quick-thread inside that mates with the main shaft 130, the pull-up mechanism 112 allows the user to affix the lid 108 to the body 102 and effectively agitate the coffee grounds in the hot water by pushing and pulling on the spinner cap 138 while holding the wingnut 172 in place. Quick threads take advantage of the materials' relative coefficients of friction to create a helicopter-blade-like-movement of the flat blades 144, very efficiently agitating the coffee grounds in the water with just a couple of cycles.

After the brewing is complete (which could be anywhere from as short as near instantly to ten minutes depending on the brew recipe), the user may need to drop the ends 146 of the flat blades 144 down far enough to engage the locking mechanism 116. Doing so may be done so by spinning counter-clockwise the wingnut 172, dropping the flat blades 144 straight down. A subsequent clockwise turn of the wingnut 172 will turn the flat blades until each detent 152 is disposed within its respective detent channel 154. Stated differently, the detent channels 154 are configured such that each has one open wall and one closed, allowing the flat blades 144 to get caught when turning the wingnut 172 clockwise (when viewed from top), corresponding to the upward/brew direction of the device 100. When each blade 144 and its corresponding detent 152 catches on a closed wall, instead of continuing to spin around as a paddle, the blade 144 switches to a straight upward trajectory as the friction of the flange seal 156 overcomes the friction of the quick-thread of the main shaft 130. When each blade 144 reaches the top of the detent channel 154, each blade 144 catches the top edge and starts to pull the entire basket 110 upwards. Doing so further engages the flange seal 156 and the extraction begins. As the basket 110 is pulled upward, a vacuum is created beneath the basket 110, the vacuum force of which is what pulls the brewed coffee through the bed of grounds and through the mesh filter 126 and optional paper filter 168. A ratcheting mechanism (not shown) may optionally be coupled to the wingnut 172 to keep the wingnut 172 in place during rotation thereof. Such a ratcheting mechanism includes but is not limited to a clutch-bearing type mechanism built into the one or more lid grommets 142. Such a mechanism would enable rotation in one direction unless the user pulled up on the main shaft 130.

As discussed above, once the locking mechanism 116 is fully engaged, the user may then pull the up the basket 110 by rotating the wingnut 172 as needed. Doing so brings the bottom 136 of the main shaft 130, with the attached agitator 114 and the now-attached basket 110, up to the top 104 of the body 102, resulting in vacuum pressure inside the body 102 to forcefully pull the brewed coffee through the bed of coffee grounds. The vacuum is created by virtue of pulling the flange seal 156 upward from the bottom 106 of the body 102, thereby permitting the coffee to pass through but not permit the coffee grounds to pass in this no-bypass immersion brewing device 100. The user continues to pull up on the basket 110 until the lip of the flange seal 156 is proximate the spout 170 and/or until the vacuum seal is broken within the interior chamber of the body 102. In this regard, it is worth noting the flange seal 156 is configured such that it pushes down more easily to the bottom 106 of the body 102 than the other way, wherein the flange seal 156 creates a strong seal when pulling back up toward the top 104 of the body 102. The strong seal when pulling back up also prevents rotation of the basket 110. Should the flange seal 156 not prevent rotation, the basket 110 would just spin in circles instead of rising back up when turning the wingnut 172 to brew coffee.

The disclosed device 100 may also comprise additional aspects or modifications to aid the user. In particular, the device 100 may comprise a rechargeable lid with timer, a motor, and an optional pressure gauge for automatic lift. Such components advantageously permit for recipes and a "set and forget" aspect, which is perfect for the service industry and general convenience. The lid preferably includes an input/output (buttons or a dial) for setting the brew time, as well as another setting for the pull speed or pressure. A feedback loop may be integrated with the pressure gauge such that a constant vacuum pressure may be maintained during extraction as desired. The motor advantageously permits a constant pull speed as defined by the torque thereof. Once the timer is set on the lid, the device 100 would wait until it is time to activate the pull-up mechanism 112, at which point the motor would engage to start to lift the basket 110 and thus begin the extraction/filtration process. The device 100 may further include a recharging connector terminal such as a USB-C connector, or it may have a removable door to change batteries periodically as needed. An LED readout may be desirable so the user can set the time easily, but such a feature may also be accomplished with an analog readout as may be desired to keep the cost of the device 100 lower or for design/aesthetic reasons. In this device 100 or variant thereof, another implementation may include a simple glass or plastic top where the only input is a dial around the entire circumference of the cap. Turning the dial would automatically set the time and start the brew clock, with the mechanism set to deploy when the time is up.

It should now be apparent that a novel, no-bypass brewing device and corresponding method have been disclosed that use vacuum pressure to forcefully pull immersion-brewed coffee through a bed of coffee grounds without permitting the latter to pass and without adversely affecting the quality of the coffee. While certain embodiments have been described, the embodiments have been presented by way of example only and are not intended to limit the scope of the inventions. Indeed, the unique immersion brewing device and method of use described herein may be embodied in a variety of other forms. Furthermore, various omissions, substitutions, and changes in the form of the disclosed elements may be made without departing from the spirit of the inventions. The accompanying claims and their equivalents are intended to cover such forms or modifications as would fall within the scope and spirit of the inventions.

The invention claimed is:

1. An immersion brewing device for brewing coffee from coffee grounds, the device comprising:

a body having a top and an opposing bottom;

a lid disposed about the top of the body;

a basket disposed within the body at or near the bottom of the body, the basket comprising a basket body having an open-ended top and an opposing bottom and configured to hold coffee grounds, a filter screen coupled to the opposing bottom of the basket body, and a flange seal disposed about the open-ended top of the basket body;

a pull-up mechanism configured to move the basket upward within the body, the pull-up mechanism comprising a main shaft having a bottom end extending into the basket body; and an agitator for agitating water contained within the body above the coffee grounds, wherein the agitator is in communication with the pull-up mechanism, wherein the agitator comprises one or more flat blades disposed about the bottom end of the main shaft and positioned within the basket body above the filter screen, wherein at least one of the one or more flat blades has a detent disposed about a first end thereof, wherein the basket body includes a detent channel cut within an interior of the basket body and configured to receive the detent, wherein the detent channel includes an open wall and a closed wall, wherein the at least one flat blade is configured to rotate relative to the basket body during agitation, and wherein the agitator is configured to lock to the basket after the water has been agitated by receipt of the detent in the detent channel and engagement of the detent with the closed wall to prevent continued rotation of the at least one flat blade relative to the basket body such that upward movement of the pull-up mechanism after the detent engages the closed wall moves the at least one flat blade, the basket and the flange seal upward together from the bottom of the body while the flange seal maintains sealing engagement with the body to create vacuum pressure beneath the basket and pull brewed coffee through the coffee grounds held by the basket body and the filter screen.

2. The immersion brewing device of claim 1, wherein the filter screen is detachably coupled to the bottom of the basket body.

3. The immersion brewing device of claim 1, wherein the main shaft has a top and an opposing bottom, wherein the pull-up mechanism further comprises a spinner cap disposed about the top of the main shaft, and a wingnut threadably coupled to the main shaft.

4. The immersion brewing device of claim 1, wherein the at least one flat blade has the first end and an opposing second end, wherein the at least one flat blade is angled downwards from the first end to the second end.

5. The immersion brewing device of claim 1, wherein the detent and the detent channel define a locking mechanism for locking the agitator to the basket.

6. The immersion brewing device of claim 5, wherein the flange seal is configured to resist rotation of the basket as the at least one flat blade moves upward with the basket body.

7. An immersion brewing device comprising:

a body having a top and an opposing bottom;

a lid disposed about the top of the body;

a basket disposed about the bottom of the body, the basket comprising a basket body having an open-ended top and an opposing bottom, a filter screen disposed at the opposing bottom of the basket body, and a flange seal disposed about the open-ended top of the basket body;

a pull-up mechanism configured to move the basket and the flange seal upward from the bottom of the body to create vacuum pressure beneath the basket;

an agitator coupled to the pull-up mechanism and comprising one or more flat blades disposed within the basket body above the filter screen, wherein at least one of the one or more flat blades is configured to rotate relative to the basket body during agitation; and a locking mechanism configured to lock the agitator to the basket after agitation, wherein the locking mechanism includes a first locking portion disposed on the at least one flat blade and a second locking portion formed within an interior of the basket body, wherein the first locking portion is configured to engage the second locking portion so the at least one flat blade moves upward with the basket body, and such that upward movement of the pull-up mechanism moves the at least one flat blade, the basket, and the flange seal upward together from the bottom of the body while the flange seal maintains sealing engagement with the body to create vacuum pressure beneath the basket and pull brewed coffee through the filter screen.

8. The immersion brewing device of claim 7, wherein the pull-up mechanism comprises a main shaft having a top and an opposing bottom, a spinner cap disposed about the top of the main shaft, and a wingnut threadably coupled to the main shaft.

9. The immersion brewing device of claim 7, wherein the at least one flat blade has a first end and an opposing second end, wherein the at least one flat blade is angled downwards from the first end to the second end.

10. The immersion brewing device of claim 7, wherein the first locking portion comprises a detent disposed about a first end of the at least one flat blade, and wherein the second locking portion comprises a detent channel cut within the interior of the basket body and configured to receive the detent, the detent channel including an open wall and a closed wall configured such that, when the detent is received in the detent channel and caught by the closed wall, the at least one flat blade moves upward with the basket body.

* * * * *